United States Patent Office 3,424,702
Patented Jan. 28, 1969

3,424,702
PROCESS OF DISSOLVING CELLULOSIC MATERIALS AND/OR SYNTHETIC POLYMERS IN LIQUID SULFUR DIOXIDE
Kunio Hata, 6—55 Araya-Hinai-cho, and Kingo Yokota, 8—2 Araya-Okawa-cho, both of Akita-shi, Akita-ken, Japan
No Drawing. Continuation-in-part of application Ser. No. 451,337, Apr. 27, 1965. This application Aug. 22, 1967, Ser. No. 666,537
Claims priority, application Japan, Apr. 28, 1964, 39/23,972
U.S. Cl. 260—17.4        6 Claims
Int. Cl. C08b *23/00;* C08f *24/30, 29/50*

ABSTRACT OF THE DISCLOSURE

Process for preparing a cellulose solution and a composite solution of cellulose and synthetic polymers.

It has been found that cellulose and synthetic polyalcohols are readily dissolved in liquid sulfur dioxide in the presence of an aliphatic secondary or tertiary amine or an alicyclic amine. It has further been found that polymethacrylics and polystyrenes are soluble in liquid sulfur dioxide either in the presence or absence of said amine. Thus, the cellulose solution and the composite solution of cellulose and one or more of the above synthetic polymers are easily prepared by a very simple procedure.

---

This application is a continuation-in-part of our copending application Ser. No. 451,337 filed Apr. 27, 1965, now abandoned.

This invention relates to a process for preparing a cellulose solution and a mixed solution of cellulose and one or more of synthetic polymers, and has particular reference to the use of liquid sulfur dioxide as a solvent for such materials in the solutions.

There has been proposed various methods of dissolving cellulose for the manufacture of yarns, films, flakes and other commercial products. As typical examples of such conventional methods, there may be mentioned the viscose rayon processing and the acetate rayon processing in which cellulose is dissolved in an esterified form. Another example is the cuprammonium process in which cellulose is dissolved in a form of complex salt. Also, many different organic solvents are known for dissolving polymers. However, these solvents in conventional practices are not always satisfactory because of their inability to provide homogeneous solution particularly where cellulose and synthetic polymers are to be mixed.

Whereas, it is the primary object of this invention to provide novel, useful methods for preparing a cellulose solution and a mixed solution of cellulose and one or more of synthetic polymers, which will eliminate the above-noted difficulties.

It is another object of the invention to provide new methods for dissolving cellulose and/or synthetic polymers in liquid sulfur dioxide which exhibits the outstanding effect as a solvent different from any conventional types of solvent.

The liquid sulfur dioxide is known as a dipolar, non-aqueous solvent having a boiling point of $-10.2°$ C., a critical temperature of $157.2°$ C., a critical pressure of 77.7 atm. and a specific gravity of $d^{-10}$ 1.46 (liquid). Gaseous sulfur dioxide may be readily condensed by cooling to less than $-10°$ C. at atmospheric pressure or by pressurizing at a room temperature.

The method of the invention for preparing the cellulose solution comprises introducing cellulose into the liquid sulfur dioxide in the presence of an aliphatic secondary or tertiary amine or an alicyclic amine. The aliphatic secondary or tertiary amine may have a chemical formula,

wherein $R_1$ is hydrogen or $C_nH_{2n+1}$, $n$ being an integer smaller than 5, and $R_2$ and $R_3$ represent $C_nH_{2n+1}$, $n$ being an integer smaller than 5. The alicyclic amine is pyridine, piperidine, piperazine or one of their derivatives which has one or two methyl groups as substituent.

The solubilization mechanism in which cellulose is dissolved in liquid sulfur dioxide in the presence of the above amines, is not precisely known at this stage of the invention. The inventors, however, attribute the results most likely to the formation of a certain adduct of sulfur dioxide, cellulose and the amine owing to the dipolar action of the liquid sulfur dioxide. It is known that an amine stoichiometrically combines with sulfur dioxide thereby forming an adduct. It is assumed that the adduct thus formed will react on hydroxyl groups of cellulose to form a certain cellulose adduct which is soluble in liquid sulfur dioxide. Thus, it is understood that the amount of the amine to be added may preferably be greater than the stoichiometric amount to hydroxyl groups of cellulose.

The inventors have ascertained from their extensive research and investigation that liquid sulfur dioxide is capable of dissolving not only cellulose but also synthetic polyalcohols, such as polyvinylalcohol, in the presence of the above amines. Thus, the inventors have succeeded in preparing a composite solution containing cellulose and synthetic polyalcohol.

The inventors have further found that polymethacrylics and polystyrenes may be easily dissolved in liquid sulfur dioxide in the presence or absence of such amines. Thus, a composite solution containing, cellulose and polymethacrylics or polystyrenes is readily prepared.

Now, the invention will be illustrated by the following specific examples.

EXAMPLE 1

1,000 milliliters of liquid sulfur dioxide cooled to $-15°$ C. was introduced into a reactor vessel wherein 30 grams of linter was dispersed, followed by the addition of 42 grams of diethylamine. The reactor was held substantially air-tight so as to keep the sulfur dioxide in liquid state and thereafter, was shaken at room temperature until a transparent, yellowish orange, viscous solution was obtained. No traces of linter were found as it was completely dissolved in the liquid sulfur dioxide.

EXAMPLE 2

Similar to Example 1, 1,000 milliliters of liquid sulfur dioxide was introduced into a reactor wherein 10 grams of chemical wood pulp was dispersed, followed by the addition of 70 grams of diisoamylamine. Thereafter, the reactor was sealed and subjected to shaking at $40°$ C., whereby a uniformly viscous solution was obtained.

EXAMPLE 3

Similar to Example 1, 1,000 milliliters of liquid sulfur dioxide was introduced into a reactor wherein 50 grams of linter was dispersed, followed by the addition of 320 grams of trimethylamine.

Thereafter, the reactor was sealed and subjected to shaking at a room temperature, whereby a uniform viscous solution was obtained.

EXAMPLE 4

Similar to Example 1, 1,000 milliliters of liquid sulfur dioxide was introduced into a reactor wherein 20 grams of ramie was dispersed followed by the addition of 500 grams of triethylamine.

Thereafter, the reactor was sealed and subjected to shaking at a room temperature, whereby a uniformly viscous solution was obtained.

EXAMPLE 5

Similar to Example 1, 1,000 milliliters of liquid sulfur dioxide was introduced into a reactor vessel wherein 25 grams of linter was dispersed, followed by the addition of 90 grams of tri-n-butyl amine.

Thereafter, the reactor was sealed and subjected to shaking at a room temperature, whereby a uniformly viscous solution was obtained.

EXAMPLE 6

Similar to Example 1, 1,000 milliliters of liquid sulfur dioxide was introduced into a reactor vessel wherein 20 grams of chemical wood pulp was dispersed followed by addition of 200 grams of lutidine.

Thereafter, the reactor was sealed and subjected to shaking at a room temperature, whereby a uniformly viscous solution was obtained.

EXAMPLE 7

Similar to Example 1, 1,000 milliliters of liquid sulfur dioxide was introduced into a reactor wherein 20 grams of chemical wood pulp was dispersed, followed by the addition of 35 grams of piperidine.

Thereafter, the reactor was sealed and subjected to shaking at a room temperature whereby a uniformly viscous solution was obtained.

EXAMPLE 8

Similar to Example 1, 1,000 milliliters of liquid sulfur dioxide was introduced into a reactor wherein 20 grams of linter pulp was dispersed, followed by the addition of 100 grams of piperazine.

Thereafter, the reactor vessel was sealed and subjected to shaking at a room temperature whereby a uniformly viscous solution was obtained.

EXAMPLE 9

Into 1,000 milliliters of liquid sulfur dioxide in a reactor vessel were introduced 20 grams of polyvinylalcohol and 30 grams of linter and 200 grams of diethylamine.

The reactor was sealed air-tight, heated to 50° C. and shaken at the same temperature until a homogeneous solution was obtained.

EXAMPLE 10

Into 1,000 milliliters of liquid sulfur dioxide in a reactor vessel were introduced 50 grams of polyvinylalcohol, 20 grams of chemical pulp and 500 grams of triethylamine.

The reactor was sealed air-tight, heated to 50° C. and shaken at the same temperature, whereby a homogeneous solution was obtained.

EXAMPLE 11

Into 1,000 milliliters of liquid sulfur dioxide in a reactor vessel were introduced 20 grams of polyvinylalcohol, 20 grams of linter and 300 grams of piperidine were added.

The reactor was sealed air-tight, heated to 50° C. and shaken at the same temperature, whereby a homogeneous solution was obtained.

EXAMPLE 12

Into 1,000 milliliters of liquid sulfur dioxide in a reactor vessel were introduced 30 grams of cellulose, 50 grams of polyvinylalcohol and 300 grams of di-iso-amyl-amine.

The reactor was sealed air-tight, heated to 50° C. and shaken at the same temperature, whereby a homogeneous solution was obtained.

EXAMPLE 13

Into 1,000 milliliters of liquid sulfur dioxide in a reactor vessel were introduced 10 grams of cellulose, 20 grams of polyvinylalcohol and 170 grams of lutidine.

The reactor was sealed air-tight, heated to 50° C. and shaken at the same temperature, whereby a homogeneous solution was obtained.

EXAMPLE 14

Into 1,000 milliliters of liquid sulfur dioxide in a reactor vessel were introduced 10 grams of polymethylmethacrylate or polystyrene, followed by the addition of 30 grams of chemical pulp and 100 grams of diethylamine.

Thereafter, the reactor was sealed air-tight and shaken at a room temperature, whereby a homogeneous mixed solution was obtained.

EXAMPLE 15

The homogeneous cellulose solution prepared by the process of Example 2 was cooled to −15° C. and added with 10 grams of polymethylmethacrylate or polystyrene. The whole mixture was sealed in a reactor vessel and the reactor was shaken at a room temperature, whereby a homogeneous mixed solution was obtained.

EXAMPLE 16

Into 1,000 milliliters of liquid sulfur dioxide in a reactor vessel were added 10 grams of polymethylmethacrylate or polystyrene, followed by the addition of 500 grams of triethylamine and 20 grams of chemical pulp. The reactor was sealed air-tight and shaken at a room temperature, whereby a homogeneous mixed solution was obtained.

EXAMPLE 17

The homogeneous cellulose solution prepared by the process of Example 4 was cooled to −15° C. and added with 10 grams of polymethylmethacrylate or polystyrene. The whole mixture was sealed in a reactor vessel and subjected to shaking at a room temperature, whereby a homogeneous mixed solution was obtained.

Thus, in accordance with the present invention, cellulose solution and a composite solution of cellulose and a synthetic polymer, such as a polyvinylalcohol, polymethylmethacrylate or polystyrene, are readily prepared with a very simple procedure.

The resulting viscous solution is highly homogeneous and readily processed for the production of yarns, films and the like.

For example, cellulose is readily regenerated from the cellulose solution by simply introducing the solution into an alcohol or water. It is appreciated that no changes in properties of the regenerated cellulose were observed.

It will be understood that it is intended to cover all changes and modifications of the examples and the invention herein chosen for the purpose of illustration which do not constitute departures from the spirit and scope of the present invention.

What is claimed is:

1. Process of preparing homogeneous cellulose solutions which comprises dissolving cellulose in liquid sulfur dioxide in the presence of an amine selected from the group consisting of aliphatic secondary and tertiary amines having the chemical formula;

where $R_1$ is hydrogen or $C_nH_{2n+1}$, $n$ being an integer smaller than 5, and $R_2$ and $R_3$ represent $C_nH_{2n+1}$, $n$ being an integer smaller than 5; and alicyclic amines of the group consisting of pyridine, piperidine, piperazine and their derivatives having one or two methyl groups as substituent.

2. Process of preparing homogeneous composite polymer solutions which comprises dissolving in liquid sulfur dioxide cellulose and one or more of synthetic polymers selected from the group consisting of polyvinylalcohols, polymethylmethacrylate and polystyrene in the presence of an amine selected from the group consisting of aliphatic secondary and tertiary amines having the chemical formula,

where $R_1$ is hydrogen or $C_nH_{2n+1}$, $n$ being an integer smaller than 5, and $R_2$ and $R_3$ represent $C_nH_{2n+1}$, $n$ being an integer smaller than 5; and alicyclic amines of the group consisting of pyridine, piperidine, piperazine and their derivatives having one or two methyl groups as substituent.

3. Process of preparing homogeneous polymer solutions as defined in claim 1, wherein said aliphatic amine is any one of the group consisting of diethylamine, di-iso-amylamine, trimethylamine, triethylamine and tributylamine.

4. Process of preparing homogeneous polymer solutions as defined in claim 1 wherein said derivative is lutidine.

5. Process of preparing homogeneous polymer solutions as defined in claim 2, wherein said aliphatic amine is any one of the group consisting of diethylamine, di-iso-amylamine, trimethylamine, triethylamine and tributylamine.

6. Process of preparing homogeneous polymer solutions as defined in claim 2, wherein said derivative is lutidine.

References Cited

UNITED STATES PATENTS 2,404,728   6/1946   Finzel _____ 260—32

FOREIGN PATENTS 301,036   2/1930   Great Britain.
399,508   10/1933   Great Britain.

OTHER REFERENCES

Tharaldsen, "Liquid Sulfur Dioxide," Chemical Abstracts, 21, 1710 (1927).

WILLIAM H. SHORT, *Primary Examiner.*

E. NIELSON, *Assistant Examiner.*

U.S. Cl. X.R.

260—212, 30.8; 106—203